(12) United States Patent
Uchiyama et al.

(10) Patent No.: US 9,769,755 B2
(45) Date of Patent: Sep. 19, 2017

(54) TERMINAL DEVICE, COMMUNICATION SYSTEM AND METHOD OF ACTIVATING TERMINAL DEVICE

(75) Inventors: Takeshi Uchiyama, Chiba (JP); Manabu Oumi, Chiba (JP); Koichi Moriya, Chiba (JP); Yutaka Tomimatsu, Chiba (JP); Yoko Shinohara, Chiba (JP); Masataka Shinogi, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 490 days.

(21) Appl. No.: 14/128,255

(22) PCT Filed: Apr. 24, 2012

(86) PCT No.: PCT/JP2012/060992
§ 371 (c)(1),
(2), (4) Date: Jan. 6, 2014

(87) PCT Pub. No.: WO2013/001900
PCT Pub. Date: Jan. 3, 2013

(65) Prior Publication Data
US 2014/0125497 A1    May 8, 2014

(30) Foreign Application Priority Data
Jun. 27, 2011    (JP) .................. 2011-141557

(51) Int. Cl.
*H04W 52/02*    (2009.01)
*H04Q 9/00*    (2006.01)
(Continued)

(52) U.S. Cl.
CPC .......... *H04W 52/0219* (2013.01); *G01D 3/10* (2013.01); *G01D 21/00* (2013.01);
(Continued)

(58) Field of Classification Search
CPC .......... G01D 21/00; G01D 21/02; G01D 3/10; H04Q 2209/823; H04Q 2209/883;
(Continued)

(56) References Cited

U.S. PATENT DOCUMENTS

| | | | | |
|---|---|---|---|---|
| 5,663,927 A | * | 9/1997 | Olson | G01V 1/22 367/131 |
| 5,969,639 A | * | 10/1999 | Lauf | H01Q 3/26 340/870.17 |

(Continued)

FOREIGN PATENT DOCUMENTS

| | | | | |
|---|---|---|---|---|
| WO | 03091046 | | 11/2003 | |
| WO | 2008107213 | | 9/2008 | |
| WO | WO 2011065028 A1 | * | 6/2011 | ............. G08C 17/00 |

OTHER PUBLICATIONS

International Search Report mailed May 22, 2012 issued in International Appln. No. PCT/JP2012-060992.
(Continued)

Primary Examiner — Nay Tun
(74) Attorney, Agent, or Firm — Adams & Wilks

(57) ABSTRACT

A terminal device has measurement sensors for measuring physical quantities of measurement targets. A storage unit stores information determining a mode for activating the measurement sensors. Based on the information stored in the storage unit, a control unit switches all or part of the measurement sensors from a non-activated state to an activated state when the measurement sensors are to be activated. An activation unit includes an activation sensor driven on the basis of environmental changes. The activation unit is configured to activate the control unit on the basis of detection results from the activation sensor when a physical quantity correlated with the physical quantity of the measurement target satisfies a given activation condition.

20 Claims, 8 Drawing Sheets

(51) Int. Cl.
  *G01D 3/10* (2006.01)
  *H04W 4/00* (2009.01)
  *G01D 21/02* (2006.01)
  *G01D 21/00* (2006.01)
(52) U.S. Cl.
  CPC ............... *G01D 21/02* (2013.01); *H04Q 9/00* (2013.01); *H04W 4/005* (2013.01); *H04Q 2209/823* (2013.01); *H04Q 2209/883* (2013.01); *H04Q 2209/886* (2013.01)
(58) Field of Classification Search
  CPC ... H04Q 2209/886; H04Q 9/00; H04W 4/005; H04W 52/0219
  See application file for complete search history.

(56) References Cited

U.S. PATENT DOCUMENTS

| | | | | |
|---|---|---|---|---|
| 7,171,312 B2* | 1/2007 | Steinthal | ............... | B82Y 30/00 422/82.02 |
| 2005/0174255 A1* | 8/2005 | Horler | .................... | G08C 17/04 340/870.01 |
| 2005/0237347 A1* | 10/2005 | Yamaji | .................... | G01D 5/14 347/5 |
| 2008/0234935 A1* | 9/2008 | Wolf | ...................... | G01C 21/16 701/472 |
| 2008/0270066 A1* | 10/2008 | Blaser | .................... | G01D 21/02 702/127 |
| 2010/0027169 A1* | 2/2010 | Knott | ........................ | H02J 1/14 361/18 |
| 2011/0092164 A1* | 4/2011 | Spanhake | ................. | H04Q 9/00 455/67.11 |
| 2011/0190600 A1* | 8/2011 | McKenna | ................. | A61B 5/01 600/301 |
| 2012/0019674 A1* | 1/2012 | Ohnishi | ................. | G08C 17/00 348/207.1 |
| 2014/0128118 A1* | 5/2014 | Tomimatsu | .............. | H04Q 9/00 455/517 |

OTHER PUBLICATIONS

Patent Abstracts of Japan, Publication No. 2004-354118, Publication Date Dec. 16, 2004.

* cited by examiner

Fig.3

| SENSOR FOR MEASUREMENT | MEASUREMENT TARGET | MEASUREMENT MODE | RESOLUTION | MINIMUM REQUIRED TIME | | POWER CONSUMPTION | | MINIMUM REQUIRED POWER AMOUNT [$\mu W \cdot sec$] | ORDER OF IMPORTANCE | REMARKS |
|---|---|---|---|---|---|---|---|---|---|---|
| | | | | PREPARATION TIME [msec] | MEASUREMENT TIME [msec] | PREPARATION [mW] | MEASUREMENT [mW] | | | |
| FIRST | FIRST PHYSICAL QUANTITY | | ANALOG | 500 | 100 | 1 | 1 | 600 | 1 | |
| SECOND | SECOND PHYSICAL QUANTITY | | ANALOG | 350 | 50 | 1 | 1 | 400 | 2 | |
| THIRD | THIRD PHYSICAL QUANTITY | a | 14bits | 150 | 50 | 1 | 1 | 200 | 7 | INITIAL STATE |
| | | b | 13bits | 150 | 40 | 1 | 1 | 190 | 6 | |
| | | c | 12bits | 150 | 30 | 1 | 1 | 180 | 4 | |
| | | d | 11bits | 150 | 20 | 1 | 1 | 170 | 3 | |
| FOURTH | FOURTH PHYSICAL QUANTITY | | 12bits | 70 | 30 | 4 | 4 | 400 | 5 | |

TERMINAL DEVICE, COMMUNICATION SYSTEM AND METHOD OF ACTIVATING TERMINAL DEVICE

BACKGROUND OF THE INVENTION

Technical Field

The present invention relates to a terminal device for transmitting results obtained by measuring (metering) physical quantities by plural measurement sensors, a communication system including the terminal device, and a method of activating the terminal device.

Background Art

In a sensor network system, a sensor terminal device performs transmission of results obtained by measuring physical quantities by measurement sensors to a base station device.

In a wireless sensor described in PTL 1, power of a power supply unit can be supplied when a sensor to be operated without the power is in an on-state, power of the power supply unit is not supplied when the sensor is in an off-state, and a transmission unit performs transmission of given information by wireless communication to the outside by receiving the power of the power supply unit.

In a sensor network system managing method described in PTL 2, a residual driving time of a battery in each sensor is acquired, a target residual driving time is set and an operation of each sensor is controlled so as to roughly equalize the residual driving time of the battery in each sensor with the target residual driving time in a sensor network system managing device capable of performing communication with plural sensors and receiving sensor information from respective sensors as well as performing operation control with respect to respective sensors. More specifically, the target residual driving time is set to a residual driving time of a battery in a sensor having the longest residual driving time of the battery at that time, and the remaining capacity of the battery is detected as well as a target average power consumption is calculated by the remaining capacity and the target residual driving time, thereby controlling the operation of the sensor so as to realize the target average power consumption.

CITATION LIST

Patent Literature

[PTL 1] JP-A-2007-108884
[PTL 2] Japanese Patent No. 3671891

However, it is necessary to use the sensor operated without the power in the above wireless sensor described in PTL 1, specifically, it is necessary to use sensors formed by a magnetic substance, a shape memory alloy, a piezoelectric device and so on, therefore, there is a problem that the degree of freedom in selecting sensors measuring physical quantities is low.

Additionally, in the sensor network system described in PTL 2, a sensor to be operated by power supplied from a power supply and a sensor operated by an included battery without the supply of power from the power supply are used, however, there is a problem that power consumption will be large when the sensor constantly receives supply of power from the power supply or the battery.

Also in these sensors, control of the manner in which the plural measurement sensors are activated has not been considered, and improvement of the entire measurement operation has not been realized.

The present invention has been made in view of the above, and an object thereof is to provide a terminal device, a communication system and a method of activating the terminal device capable of realizing high-performance sensing and lower power consumption as well as improving the entire measurement operation by controlling the manner in which the plural measurement sensors are activated.

According to the present invention, there is provided a terminal device including a plurality of measurement sensors (hereinafter also "sensors for measurement") for measuring physical quantities of measurement targets, a storage unit storing information for determining activation manners of the plural sensors for measurement, a control unit switching all or part of the plural sensors for measurement from a non-activated state to an activated state based on the information when activated, and an activation unit including an activation sensor (hereinafter also "a sensor for activation") to be driven based on a change of environment and for activating the control unit when a physical quantity having a correlation with the physical quantity of the measurement target is satisfied as a given activation condition based on a detection result by the sensor for activation.

In the terminal device according to the invention, the sensor for activation may be driven by generating power based on a change of environment.

In the terminal device according to the invention, the information may be based on respective preparation times and measurement times of the plural sensors for measurement.

In the terminal device according to the invention, it is possible that the measurement times of the plural sensors for measurement to be activated do not overlap in the information.

In the terminal device according to the invention, an operation time of the control unit from the activation of the control unit until a series of operations by the control unit performed in accordance with the activation is completed may become minimum in the information.

In the terminal device according to the invention, the control unit may drive the plural sensors for measurement in descending order of the preparation time.

In the terminal device according to the invention, the control unit may drive the plural sensors for measurement in descending order of the time obtained by adding the preparation time and the measurement time.

In the terminal device according to the invention, the total of power consumption of the sensors for measurement to be activated may be equal to or less than the allowable maximum value with respect to instantaneous power consumption in the information.

In the terminal device according to the invention, the total of power consumption amounts of the sensors for measurement to be activated may be equal to or less than the allowable maximum value with respect to the power consumption amount in the information.

In the terminal device according to the invention, the information may have information based on the order of importance of the respective plural sensors for measurement.

In the terminal device according to the invention, it is possible that the control unit does not activate the sensor for measurement with the lowest preference when the total of power consumption or the total of power consumption amounts is equal to or higher than the maximum value.

In the terminal device according to the invention, the information may include the order of activating the sensors for measurement to be activated.

In the terminal device according to the invention, the control unit may enter a sleep mode when the sensors for measurement to be activated is in the preparation time in the case where all or part of the plural sensors for measurement is activated.

In the terminal device according to the invention, the information may be a table showing a correspondence between states of the terminal device and the activation manners, and the control unit may be operated based on the information.

In the terminal device according to the invention, the information may be a table showing correspondence between states of the terminal device and the activation manners, and the control unit may be operated based on the information.

In the terminal device according to the invention, the control unit may switch the sensors for measurement from the non-activated state to the activated state by switching a state in which power is not supplied to the sensors for measurement to a state in which power is supplied when activated.

According to the present invention, there is provided a communication system including a terminal device and a base station device, in which the terminal device has a plurality of sensors for measurement measuring physical quantities of measurement targets, a storage unit storing information for determining activation manners of the plural sensors for measurement, a control unit switching all or part of the plural sensors for measurement from a non-activated state to an activated state in an activation manner determined based on information stored in the storage unit when activated, an activation unit including a sensor for activation to be driven based on a change of environment and activating the control unit when a given activation condition is satisfied based on a detection result by the sensor for activation, and a communication unit transmitting information of measurement results by all or part of the plural sensors for measurement, and the base station device receives information transmitted from the terminal device.

In the communication system according to the present invention, the sensor for activation may be driven by generating power based on a change of environment.

According to the present invention, there is provided a method of activating a terminal device including the steps of activating a control unit by an activation unit including a sensor for activation to be driven based on a change of environment when a given activation condition is satisfied based on a detection result by the sensor for activation, switching all or part of the plural sensors for measurement from a non-activated state to an activated state in activation manners determined based on information for determining activation manners of the plural sensors for measurement which is stored in a storage unit when activated by the control unit, measuring physical quantities of measurement targets by the activated sensors for measurement, and transmitting information of measurement results by all or part of the plural sensors for measurement by a communication unit.

In the method of activating the terminal device according to the embodiment, the sensor for activation may be driven by generating power based on a change of environment.

In the terminal device, the communication system and the method of activating the terminal device according to the present invention, high-performance sensing and lower power consumption can be realized as well as the entire operation of measurement can be improved by controlling activation manners of plural sensors for measurement.

BRIEF DESCRIPTION OF THE DRAWINGS

FIG. 3 is a table showing an example of basic information of sensors for measurement stored by the sensor terminal device according to the first embodiment of the present invention.

DETAILED DESCRIPTION OF THE INVENTION

Hereinafter, embodiments for carrying out the present invention will be explained in detail with reference to the drawings.

First Embodiment

Figure 1:
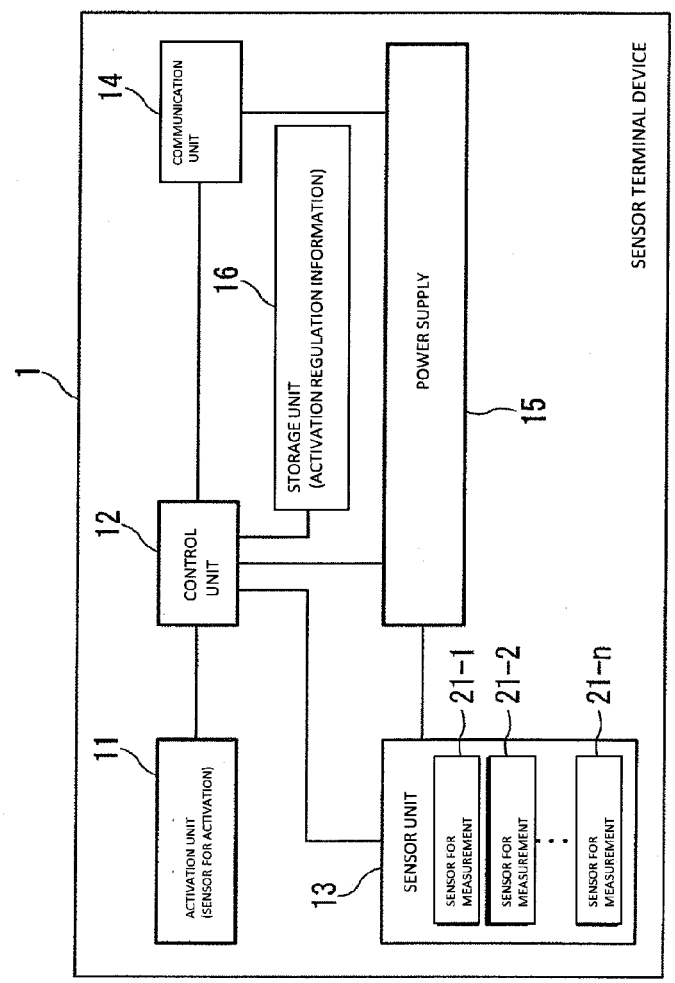
FIG. 1 is a schematic block diagram showing a configuration of a sensor terminal device according to a first embodiment of the present invention.

FIG. 1 is a schematic block diagram showing a configuration of a sensor terminal device 1 (an example of a terminal device) according to a first embodiment of the present invention.

The sensor terminal device 1 according to the embodiment includes an activation unit 11, a control unit 12, a sensor unit 13, a communication unit 14, a power supply 15 and a storage unit 16. The sensor unit 13 includes a plurality of (n-pieces) measurement sensors (hereinafter "sensors for measurement") 21-1 to 21-n.

The activation unit 11 includes one or more activation sensors (hereinafter "sensors for activation") for detecting a change of environment around the sensor terminal device 1. When the sensor for activation detects that the change of environment around the sensor terminal device 1 has satisfied a given activation condition, the activation unit 11 transmits a given signal to the control unit 12 as an interrupt signal to the control unit 12. As described above, the activation unit 11 functions as a switch for activation.

Here, in the embodiment, the activation unit 11 has a circuit configuration of transmitting, as the given signal, a signal in a level exceeding a given threshold value for activating the control unit 12 as the interrupt signal when the change of environment around the sensor terminal device 1 satisfies the given activation condition.

In the embodiment, the interrupt signal is transmitted to the control unit 12 when the sensor for activation detects that the change of environment around the sensor terminal device 1 has satisfied the given activation condition. As another example, it is also possible to apply a configuration in which the sensor for activation constantly transmits signals corresponding to detection results as interrupt signals, and interruption is actually performed with respect to the control unit 12 when the level of the interrupt signal inputted to the control unit 12 exceeds the given threshold value.

Here, as the activation condition for transmitting the interrupt signal to the control unit 12 by the activation unit 11, various conditions may be used, and for example, a condition that variation in environment around the sensor terminal device 1 exceeds a given threshold value can be used.

The interrupt signal is used as the signal for activating the control unit 12 by the activation unit 11 in the embodiment, however, other signals may be used.

In the case where plural sensors for activation are provided in the activation unit 11, it is possible to apply a configuration as an example in which respective sensors for activation are independently operated and the interrupt signal is transmitted to the control unit 12 when a change of surrounding environment satisfying the given activation condition is detected, and the configuration is used in the embodiment. It is also possible to apply a configuration as another example in which the interrupt signal is transmitted to the control unit 12 by the activation unit 11 when a combination of detection states of plural sensors for activation provided in the activation unit 11 satisfies the given activation condition.

In the case where the plural sensors for activation are provided in the activation unit 11, it is possible to use sensors detecting the same physical quantity with the same sensitivity and resolution, sensors detecting the same physical quantity with different sensitivities and resolutions, sensors detecting different physical quantities or combinations of above sensors as these plural sensors for activation.

Though the power is constantly supplied to the control unit 12 from the power supply 15, the control unit 12 is normally in a sleep mode. Then, the control unit 12 is activated when an input value of the interrupt signal from the activation unit 11 at an input end exceeds the given threshold value.

As described above, when the interrupt signal is inputted to the control unit 12 from the activation unit 11, the control unit 12 makes a transition from the sleep mode to an activation state in the embodiment.

Though the sleep mode is used as a state in which the control unit 12 is not activated in the embodiment, other states in which power consumption is lower than the activated state may be used as other examples.

Here, in the embodiment, a sensor not requiring power for detecting a change of surrounding environment is used as the sensor for activation. Accordingly, the activation unit 11 is not connected to the power supply 15.

As the sensor for activation, sensors detecting various objects (physical quantities) may be used, and for example, sensors using materials such as a magnetic substance, a thermoelectric device, a piezoelectric device and a pyroelectric device can be used. In such sensors for activation, power consumption during standby is substantially zero, and the sensors can detect a change of environment (for example, any of electromagnetic waves, temperature, pressure, airflow, sound waves, fine-grain flow and so on) in which the sensor terminal device 1 is placed.

As a specific example, when a flow sensor using a piezoelectric substance is used as the sensor for activation, a voltage corresponding to a flow velocity is generated. In this case, when the velocity of fluid around the sensor terminal device 1 exceeds a certain value, the control unit 12 is activated. A power-generation type acceleration sensor and so on can be used as the sensor for activation in addition to the above.

Though the sensor not requiring supply of the power from the outside for detecting a change of surrounding environment is used as the sensor for activation in the embodiment, it is also preferable that a sensor requiring supply of lower power than the sensors for measurement from the outside for detecting a change of surrounding environment is used as another example. In this case, for example, a configuration in which a battery is provided in the sensor for activation and power from the battery is supplied to the sensor for activation, or a configuration in which power from the power supply 15 provided in the sensor terminal device 1 is supplied to the sensor for activation can be applied. The sensor terminal device with low power consumption can be realized by using the sensor for activation to be driven with lower power consumption than the sensors for measurement while receiving supply of power from the outside.

The storage unit 16 stores information used for determining a manner (mode) such as the order of activating the respective sensors for measurement 21-1 to **21-*n* provided in the sensor unit 13. The information includes, for example, information relating to characteristics of the respective sensors for measurement 21-1 to 21-*n***.

Here, sensors requiring power for detecting a change of surrounding environment are used as the respective sensors for measurement 21-1 to **21-*n* in the embodiment. It is also preferable that sensors not requiring power for detecting a change of surrounding environment are used for part of the respective sensors for measurement 21-1 to 21-*n*** as another example, and such sensors can be also used as the sensors for activation in the embodiment.

It is also preferable that various types of sensors are used as the respective sensors for measurement 21-1 to **21-*n*, which are, for example, a vibration sensor, an acceleration sensor, a video camera, a smoke sensor, a humidity sensor and so on can be used. Then, various conditions such as temperature, humidity, a flow rate, flow velocity, illuminance and human motion can be measured by the respective sensors for measurement 21-1 to 21-*n***.

In the embodiment, there is a correlation (causal relationship) between targets (physical quantities) measured by the sensors for measurement 21-1 to **21-*n* and targets (physical quantities) measured by the sensor for activation. As examples of correlated targets, there are the same physical quantity as a physical quantity detected by the sensor for activation, and a different physical quantity assumed to be changed when a change of a physical quantity as a target is detected by the sensor for activation. As a specific example, light, vibration, temperature and so on can change when a person passes, therefore, one or more physical quantities of the above are detected by the sensor for activation, and one or more physical quantities which are the same as or different from each other of the above can be measured by the sensors for measurement 21-1 to 21-*n***.

The sensors outputting the measurement results by analog signals in the measurement time are used as the respective sensors for measurement 21-1 to **21-*n***, and sensors outputting measurement results by digital signals are used as another example in the embodiment.

In the embodiment, the control unit 12 is digitally operated. The measurement results outputted by the sensors for measurement 21-1 to 21-$n$ by analog signals are converted from analog signals to digital signals by an A/D (Analog to Digital) converter.

As a preferred example of the embodiment, the control unit 12 enters the sleep mode to suppress the power consumption while the respective sensors for measurement 21-1 to 21-$n$ are in the preparation time. After the respective sensors for measurement 21-1 to 21-$n$ complete the preparation time, the control unit 12 is activated again and acquires measurement results by the respective sensors for measurement 21-1 to 21-$n$. Here, as the configuration in which the control unit 12 enters the sleep mode while the respective sensors for measurement 21-1 to 21-$n$ are in the preparation time, it is also preferable to apply a configuration, for example, in which the control unit 12 is returned to the activated state from the sleep mode slightly before the preparation time of the respective sensors for measurement 21-1 to 21-$n$ ends. Additionally, when a certain sensor for measurement is in the preparation time but it is necessary to acquire the measurement result by another sensor for measurement, the control unit 12 is in the activated state without entering the sleep mode.

The control unit 12 outputs the measurement results acquired by being inputted by the respective sensors for measurement 21-1 to 21-$n$ to the communication unit 14.

The communication unit 14 transmits the measurement results inputted from the control unit 12 to a base station device (not shown in FIG. 1). In the communication unit 14, wired communication may be performed as well as wireless communication may be performed.

The power supply 15 supplies power to the control unit 12, the respective sensors for measurement 21-1 to 21-$n$ provided in the sensor unit 13 and the communication unit 14. In the embodiment, the control unit 12 controls the supply of power from the power supply 15 to the respective sensors for measurement 21-1 to 21-$n$ provided in the sensor unit 13. As the power supply 15, for example, a battery such as a storage battery can be used.

Figure 2:
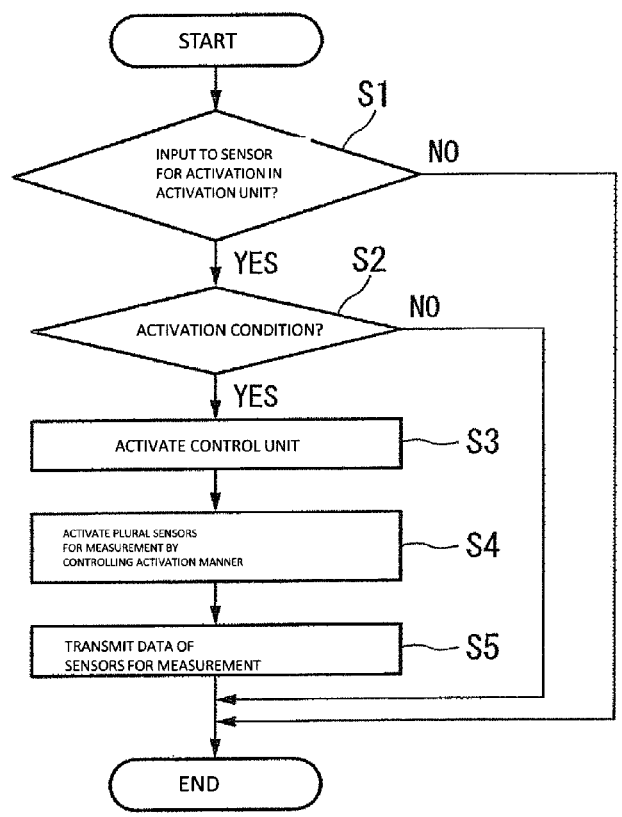
FIG. 2 is a view showing a flowchart of an operation performed by the sensor terminal device according to the first embodiment of the present invention.

FIG. 2 is a view showing a flowchart of an operation performed by the sensor terminal device 1 according to the embodiment.

In the explanation of the flowchart, the explanation will be made by taking the operation corresponding to presence/absence of detection of a detection target by the sensor for activation provided in the activation unit 11 as one operation, however, such operation is constantly performed in the embodiment.

When there is no input of a detection target (variation in environment around the sensor terminal device 1 in the embodiment) to the sensor for activation provided in the activation unit 11 while the control unit 12 is in the sleep mode (Step 1), the detection target is not detected by the sensor for activation, therefore, the control unit 12 continues in the sleep mode.

When there is an input of the detection target to the sensor for activation provided in the activation unit 11 while the control unit 12 is in the sleep mode (Step 1), in the case where the a given activation condition is not satisfied (Step S2), for example, in the case where the level of the input is lower than a given threshold value, the control unit 12 continues in the sleep mode.

When there is an input of the detection target to the sensor for activation provided in the activation unit 11 while the control unit 12 is in the sleep mode (Step 1), in the case where the given activation condition is satisfied (Step S2), for example, in the case where the level of the input is equal to or higher than the given threshold value, the sensor for activation outputs an interrupt signal to the control unit 12.

When the interrupt signal is inputted from the activation unit 11 (the sensor for activation provided in the activation unit 11 in the embodiment) during the sleep mode, the control unit 12 makes a transition to the activated state and is driven (Step S3). Then, the control unit 12, when being activated, refers to information stored in the storage unit 16 and performs control so as to supply the power from the power supply 15 to the respective sensors for measurement 21-1 to 21-$n$ in the activation manner such as the activation order determined based on the information. Accordingly, the respective sensors for measurement 21-1 to 21-$n$ are activated in the activation manner (Step S4).

The respective sensors for measurement 21-1 to 21-$n$ are activated and measure the measurement targets, then, output the measurement results to the control unit 12. The control unit 12 outputs the measurement results inputted from the respective sensors for measurement 21-1 to 21-$n$ to the communication unit 14. The communication unit 14 transmits the measurement results inputted from the control unit 12 to the base station device (not shown in FIG. 1) (Step S5).

In the embodiment, when the control unit 12 is activated by the activation unit 11 while the control unit 12 is in the sleep mode, the respective sensors for measurement 21-1 to 21-$n$ are activated by performing control by the control unit 12 so as to supply power from the power supply 15 to the respective sensors for measurement 21-1 to 21-$n$, measurement by the respective sensors for measurement 21-1 to 21-$n$ is performed and the measurement results are transmitted from the communication unit 14 through the control unit 12, the control unit 12 performs control so as to stop supplying power from the power supply 15 to the sensors for measurement 21-1 to 21-$n$ which have completed acquisition of measurement results, then, the control unit 12 makes a transition to the sleep mode again when processing of acquiring measurement results is completed.

As described above, the sensor terminal device 1 according to the embodiment can stand by in a state in which power is not used by the control unit 12 and the sensors for measurement 21-1 to 21-$n$ until the sensor for activation for activating the control unit 12 which controls the sensors for measurement 21-1 to 21-$n$ activates the control unit 12, which can save power. However, in the case where the control unit 12 consumes power during the sleep mode, power for that will be used.

The above effect can be also obtained when the sensor for activation does not generate power by itself and is driven by receiving supply of power lower than that used by the sensors for measurement from the power supply 15. Additionally, when the sensor for activation is driven by generating power by itself in accordance with a change of environment, further power saving effect can be obtained.

The above power-saving effect can be also obtained in the entire sensor network in which the sensor terminal device 1 is provided, which can reduce power consumption of the entire network. In particular, when applied to an application in which ratio of time in which sensing is necessary occupying the real time is low, the effect of reducing power consumption is large.

Therefore, it is possible to drastically reduce power consumption (standby power) and for example, the lifetime of the power supply 15 formed by the battery can be extended in the sensor terminal device 1 according to the embodiment.

Accordingly, the frequency and costs of maintenance such as battery exchange with respect to the sensor terminal device 1 can be reduced and effects given to environment by the sensor network (for example, power consumption and disposition of the battery) can be also reduced. In the case where it is sufficient that the lifetime of the battery 15 is the same as that of a device not according to the embodiment, the size of, for example, the battery used as the power supply 15 can be reduced, and thus, the size of the sensor terminal device 1 can be reduced.

Additionally, as the control unit 12 and the sensors for measurement 21-1 to 21-*n* operate only when the given activation condition is satisfied based on the change of surrounding environment, the device is efficient.

When the power-generation type sensor is used as the sensor for activation, the interrupt signal to the control unit 12 is easily generated.

The sensor terminal device 1 according to the embodiment includes the sensors for measurement 21-1 to 21-*n* separately from the sensor for activation, therefore, it is possible to allow these sensors to be different from each other. Accordingly, the degree of freedom in selecting sensors (the degree of freedom in design) can be increased with respect to the sensors for measurement 21-1 to 21-*n* and various types of sensors can be used, which increases the function of the sensor terminal device 1.

Therefore, high-performance sensing and lower power consumption can be realized in the sensor terminal device 1 according to the embodiment.

Here, the configuration of the sensor terminal device 1 according to the embodiment can be also regarded as follows.

That is, the sensor terminal device 1 includes one or more sensors for measurement 21-1 to 21-*n*, the control unit 12 switching between a first power consumption state in which the sensors for measurement 21-1 to 21-*n* are in a non-activated state and a second power consumption state in which the sensors for measurement 21-1 to 21-*n* are in an activated state and power is consumed more than in the first power consumption state, the activation unit 11 transmitting the interrupt signal activating the control unit 12 with respect to the control unit 12, the communication unit 14 performs communication of information of measurement results obtained from the sensors for measurement 21-1 to 21-*n* through the control unit 12 with the outside and the power supply 15 supplying power to the sensors for measurement 21-1 to 21-*n*, the control unit 12 and the communication unit 14.

Moreover, the method of activating the above sensor terminal device 1 can be also regarded as follows.

That is, the sensor terminal device 1 includes a step of activating the activation unit 11 based on a change of environment, a step of transmitting the interrupt signal to the control unit 12 by the activated activation unit 11 to activate the control unit 12, and a step of switching between the first power consumption state in which the sensors for measurement 21-1 to 21-*n* are in the non-activated state and the second power consumption state in which the sensors for measurement 21-1 to 21-*n* are in the activated state and power is consumed more than in the first power consumption state depending on the activation state.

Here, in the first power consumption state, it is not always necessary to use the state in which power consumption of the control unit 12 is zero, and for example, power lower than that used at the time of activation may be consumed by the control unit 12.

Next, information stored in the storage unit 16 and to control activation manners such as the order of activating the respective sensors for measurement 21-1 to 21-*n* by the control unit 12 in the sensor terminal device 1 according to the embodiment will be explained.

FIG. 3 is a table showing an example of basic information of the sensors for measurement 21-1 to 21-*n* to be stored by the storage unit 16 provided in the sensor terminal device 1 according to the embodiment. The information relates to characteristics of the respective sensors for measurement 21-1 to 21-*n*.

Here, a case where the number of sensors for measurement 21-1 to 21-*n* is four (case of n=4) is shown in the embodiment.

In the example shown in FIG. 3, as basic information of the sensors for measurement 21-1 to 21-4 (the first to fourth sensors for measurement), information of measurement targets, measurement modes, resolution, minimum required time, power consumption, minimum required electric energy, order of importance and remarks concerning the respective sensors for measurement 21-1 to 21-4 are stored in the storage unit 16.

As the measurement targets, physical quantities (first to fourth physical quantities) as targets to be measured by the respective sensors for measurement 21-1 to 21-4 are stored.

As the measurement modes, a state in which there are four different measurement modes a, b, c and d in the third sensor for measurement 21-3 is stored.

As the resolution, the bit numbers of the respective measurement modes a, b, c and d of the third sensor for measurement 21-3 obtaining digital measurement results and the forth sensor for measurement 21-4 obtaining a digital measurement result are respectively stored in the embodiment. The first sensor for measurement 21-1 and the second sensor for measurement 21-2 obtain analog measurement results, and the resolution thereof is not stored in the embodiment.

As the minimum required time, preparation time [msec] to be minimally required and measurement time [msec] to be minimally required concerning the respective sensors for measurement 21-1 to 21-4 and the respective measurement modes are stored. Generally, there is no correlation between the length of the preparation time and the length of the measurement time of a certain sensor.

As the power consumption, power consumption [mW] at the time of preparation and power consumption [mW] at the time of measurement concerning the respective sensors for measurement 21-1 to 21-4 and the respective measurement modes are stored. In the example shown in FIG. 3, the power consumption at the time of preparation and the power consumption at the time of measurement are the same in all of the four measurement modes a, b, c and d of the third sensors for measurement 21-3, however, a case where the power consumption at the time of preparation and the power consumption at the time of measurement can be different in respective measurement modes a, b, c and d as another example.

As the minimum required electric energy, the electric energy [μW·sec] to be minimally required at the time of preparation time and at the time of measurement time concerning the respective sensors for measurement 21-1 to 21-4 and the respective measurement modes are stored. The minimum required electric energy can be calculated from the minimum required time and the power consumption.

As the order of importance, the order of importance is stored concerning the respective sensors for measurement 21-1 to 21-4 and the respective measurement modes. In the embodiment, ranks of importance 1 to 7 are previously set concerning seven items of the first sensor for measurement 21-1, the second sensor for measurement 21-2, respective measurement modes a, b, c and d of the third sensor for measurement 21-3 and the fourth sensor for measurement 21-4. In the embodiment, the smaller a numeral of the order of importance is, the higher the importance is.

As the remarks, various contents may be stored, and a state in which a measurement mode "a" is in an initial state in the four measurement modes a, b, c and d of the third sensor for measurement 21-3 is stored in the example shown in FIG. 3.

Also in the storage unit 16, information of setting up regulations (activation regulation information) for determining the activation manner such as the order of activating the respective sensors for measurement 21-1 to 21-$n$ is stored.

The control unit 12 refers to the activation regulation information stored in the storage unit 16 and controls activation of the respective sensors for measurement 21-1 to 21-$n$ in an activation manner such as the order of activating the respective sensors for measurement 21-1 to 21-$n$ determined based on the activation regulation information. In order to perform such control, the control unit 12 refers to basic information of the sensors for measurement 21-1 to 21-$n$ stored in the storage unit 16 shown in FIG. 3, acquires and refers to information concerning a changing state of the respective sensors for measurement 21-1 to 21-$n$, acquires and refers to information concerning a changing state of the power supply 15 or the like according to need.

Here, as the activation regulation information, information of setting up activation manners such as the order of activating the respective sensors for measurement 21-1 to 21-$n$ regardless of the changing state of the respective sensors for measurement 21-1 to 21-$n$ or the changing state of the power supply 15 can be used as an example. In this case, the control unit 12 refers to such activation regulation information and controls activation of the respective sensors for measurement 21-1 to 21-$n$ in the activation manner such as the activation order and the like corresponding to the activation regulation information.

Moreover, in addition to the above activation regulation information, information of setting up regulations for correcting the activation manner of the respective sensors for measurement 21-1 to 21-$n$ can be included in the activation regulation information for adapting the activation manner to the changing state of the respective sensors for measurement 21-1 to 21-$n$ or the changing state of the power supply 15. In this case, the control unit 12 takes the activation manner based on information setting up the activation manner such as the order of activating the respective sensors for measurement 21-1 to 21-$n$ regardless of the changing state of the respective sensors for measurement 21-1 to 21-$n$ or the changing state of the power supply 15 as a standard, correcting the activation manner as the standard based on a change of the state of the respective sensors for measurement 21-1 to 21-$n$ or a change of state of the power supply 15 from the information of setting up regulations for correcting the activation manner of the respective sensors for measurement 21-1 to 21-$n$, and using the activation manner after the correction.

Specifically, for example, the control unit 12 uses the activation manner such as the activation order determined based on basic information of the respective sensors for measurement 21-1 to 21-$n$ as the standard in the initial state, then, uses the activation manner corrected from the standard activation manner for adapting the state to a state after a change in the case where the measurement mode, the charge amount of the respective sensors for measurement 21-1 to 21-$n$ or the remaining amount of the power supply 15 has changed.

In the above description, the configuration in which the control unit 12 corrects and uses the activation manner by predetermined calculation in the case where the activation manners as the standard is previously set and it is necessary to correct the activation manner has been shown, however, information of a table indicating correspondence between changing states of the respective sensors for measurement 21-1 to 21-$n$ or changing states of the power supply 15 and activation manners to be used may be used as another example. In this case, the control unit 12 refers to the table to read and use an activation manner associated to the state of the respective sensors for measurement 21-1 to 21-$n$ or the state of the power supply 15. In this case, the contents of the regulations are reflected on the contents of the table in advance.

When using such table, the states of respective sensors for measurement 21-1 to 21-$n$ or the states of the power supply 15 may be associated one-to-one with activation manners, however, plural ranges are provided with respect to the states of respective sensors for measurement 21-1 to 21-$n$ or the states of the power supply 15 and respective ranges are one-to-one associated with the activation manners as another example, thereby reducing the number of associations.

The control unit 12 determines whether which sensors for measurement 21-1 to 21-$n$ are activated and which sensors for measurement 21-1 to 21-$n$ are stopped based on the above activation regulation information, and controls the activation and the stop of the respective sensors for measurement 21-1 to 21-$n$ in accordance with the determination result. Accordingly, the activation manner based on the activation regulation information can be realized.

Next, examples of the contents of regulations set up by the activation regulation information will be shown.

In the embodiment, regulations in which measurement times of plural sensors for measurement 21-1 to 21-$n$ do not overlap and the entire period of time is shortened so as not to affect the power and so on are basically used.

First Regulation Example

The activation manner such as the order (activation ranks) of activating plural sensors for measurement 21-1 to 21-$n$ provided in the sensor unit 13 is previously set, and the activation manner is used as a regulation. As an example, start time points of activation of the respective sensors for measurement 21-1 to 21-$n$ are fixed in the activation manner and the control unit 12 activates the respective sensors for measurement 21-1 to 21-$n$ in accordance with the manner as an example.

Second Regulation Example

An activation manner determined based on the preparation time and the measurement time of the respective sensors for measurement 21-1 to 21-$n$ provided in the sensor unit 13 is used as a regulation. The control unit 12 can acquire information of the preparation time and the measurement time of the respective sensors for measurement 21-1 to 21-$n$ by referring to information stored in the storage unit 16.

Third Regulation Example

Concerning the above (second regulation example), an activation manner in which plural sensors for measurement 21-1 to 21-*n* are activated in descending order of a warm-up time (preparation time in the embodiment) of the respective sensors for measurement 21-1 to 21-*n* is used as an example.

Fourth Regulation Example

Concerning the above (second regulation example), an activation manner in which the sensor in the plural sensors for measurement 21-1 to 21-*n* having the longest warm-up time (preparation time in the embodiment) is activated first is used as another example. It is not necessary that the order of activating sensors for measurement to be activated second and after that follows the order of the length of the warm-up time (preparation time in the embodiment).

Fifth Regulation Example

Concerning the above (second regulation example), an activation manner in which plural sensors for measurement 21-1 to 21-*n* are activated in descending order of the time obtained by adding the preparation time and the measurement time of the respective sensors for measurement 21-1 to 21-*n* is used as another example.

Sixth Regulation Example

Concerning the above (second regulation example), an activation manner in which the sensor in the plural sensors for measurement 21-1 to 21-*n* having the longest time obtained by adding the preparation time and the measurement time is activated first is used as another example. It is not necessary that the order of activating sensors for measurement to be activated second and after that follows the order of the length of the time obtained by adding the preparation time and the measurement time.

Seventh Regulation Example

When the necessity of shifting the activation timing of any of sensors for measurement occurs, the sensor with the shortest warm-up time (preparation time in the embodiment) in the plural sensors for measurement 21-1 to 21-*n* is shifted.

Eighth Regulation Example

When the necessity of shifting the activation timing of any of sensors for measurement occurs, the sensor with the shortest time obtained by adding the preparation time and the measurement time in the plural sensors for measurement 21-1 to 21-*n* is shifted.

Ninth Regulation Example

When the necessity of shifting the activation timing of any of sensors for measurement occurs, the sensor with the slowest activation timing in the plural sensors for measurement 21-1 to 21-*n* is shifted.

Tenth Regulation Example

An activation manner in which measurement times of plural sensors for measurement 21-1 to 21-*n* provided in the sensor unit 13 do not overlap is used as a regulation.

In the embodiment, when the measurement results by the plural sensors for measurement 21-1 to 21-*n* are outputted to the control unit 12, if outputs from two or more sensors for measurement 21-1 to 21-*n* to the control unit 12 overlap at the same time, these measurement results are not acquired normally by the control unit 12. That is, it is difficult to perform communication of the measurement results between two or more sensors for measurement 21-1 to 21-*n* and the control unit 12 at the same time in the embodiment. Accordingly, the present regulation is effective.

Eleventh Regulation Example

An activation manner in which an operation time of the control unit 12 becomes minimum is used as a regulation.

Here, as the operation time of the control 12 to be the minimum, for example, a period of time from the activation by the activation unit 11 until measurement by the sensors for measurement 21-1 to 21-*n* (activated sensors) and the communication of measurement results are completed and the control unit 12 returns to the sleep state again is used.

Twelfth Regulation Example

An activation manner such as the activation order determined based on power consumption of the respective sensors for measurement 21-1 to 21-*n* provided in the sensor unit 13 is used as a regulation. The control unit 12 can acquire information of power consumption (information of instantaneous power consumption and information of an amount of power consumption which is temporarily averaged) by referring to basic information of the sensors for measurement 21-1 to 21-*n* stored in the storage unit 16.

Thirteenth Regulation Example

Concerning the above (twelfth regulation example), an activation manner in which the total of power consumption of the sensors for measurement 21-1 to 21-*n* to be activated does not exceed the maximum supply power (allowable maximum value) in the sensor terminal device 1 with respect to instantaneous power consumption is used as an example. The control unit 12 can acquire information of lifetime (remaining power in the sensor terminal device 1) of the power supply 15 and can acquire information of the instantaneous maximum power supply.

Fourteenth Regulation Example

Concerning the above (twelfth regulation example), an activation manner in which the total of the power consumption amount of the sensors for measurement 21-1 to 21-*n* to be activated does not exceed the maximum power supply amount (allowable maximum value) in the sensor terminal device 1 with respect to the amount of power consumption which is temporarily averaged is used as another example. The control unit 12 can acquire information of lifetime (remaining power in the sensor terminal device 1) of the power supply 15 and can acquire information of the maximum power supply amount.

Fifteenth Regulation Example

Concerning the above (twelfth regulation example), an activation manner in which power consumption used in one communication by the communication unit 14 does not exceed the maximum power supply in the sensor terminal device 1 with respect to instantaneous power consumption is used as another example. The control unit 12 can acquire information of lifetime (remaining power in the sensor terminal device 1) of the power supply 15 and can acquire information of the instantaneous maximum power supply.

Sixteenth Regulation Example

Concerning the above (twelfth regulation example), an activation manner in which the plural sensors for measurement are activated in ascending order of power consumption is used as another example.

Seventeenth Regulation Example

An activation manner determined based on the lifetime (remaining power in the sensor terminal device 1) of the power supply 15 such as a battery provided in the sensor terminal device 1 is used as a regulation. The control unit 12 can acquire information of lifetime (remaining power in the sensor terminal device 1) of the power supply 15.

Eighteenth Regulation Example

An activation manner such as the activation order determined based on charge amounts of the respective sensors for measurement 21-1 to 21-n provided in the sensor unit 13 is used as a regulation. The control unit 12 can acquire information of the charge amounts of the respective sensors for measurement 21-1 to 21-n.

Nineteenth Regulation Example

Concerning the instantaneous power consumption and power consumption which is temporarily averaged, an activation manner in which the preparation time of any one or more sensors for measurement is shortened is used as a regulation when it is necessary to limit the power consumption. The control unit determines the sensors for measurement in which the preparation time is shortened by referring to information stored in the storage unit 16.

In the digital sensors for measurement, the accuracy of measurement is reduced as well as power consumption is reduced when the resolution (bit number) of measurement is reduced.

Twentieth Regulation Example

Concerning the instantaneous power consumption and power consumption which is temporarily averaged, an activation manner in which measurement by any one or more sensors for measurement is omitted (namely, is not performed) is used as a regulation when it is necessary to limit the power consumption. The control unit 12 determines the sensors for measurement in which measurement is omitted by referring to information stored in the storage unit 16.

As an example, the measurement by the sensors for measurement is omitted in the case where the reduction of power consumption is not sufficient only by shortening the preparation time by any of the sensors for measurement.

Twenty-First Regulation Example

In the case where any of sensors for measurement is shortened, in the case where measurement by any of sensors for measurement is omitted, and the case where a measurement manner by any of sensors for measurement is changed, the activation manner to be a target of the change is used in preference to the sensor with a lower order of importance set up to the respective sensors for measurement 21-1 to 21-n.

Note that, for example, the control unit 12 can acquire information of the order of importance in the respective sensors for measurement 21-1 to 21-n by, for example, referring to basic information of the sensors for measurement 21-1 to 21-n stored in the storage unit 16.

Here, regulations shown as the above and other various regulations can be used by arbitrarily combining two or more regulations within a range consistent to each other in the embodiment.

As a specific example, a period of time necessary for the entire operation of measurement can be reduced by considering the preparation time and the measurement time of the respective sensors for measurement 21-1 to 21-n, and the entire operation of measurement can be appropriately performed with sufficient power by considering the amounts of the instantaneous power consumption and power consumption which is temporarily averaged so as to fall within available ranges respectively. Moreover, both effects can be obtained by considering the both conditions.

Next, examples of operations performed by the sensor terminal device 1 according to the embodiment are shown.

In explanation of FIG. 4 to FIG. 7, a state in which a given activation condition determined by the activation unit 11 is satisfied is referred to as an on-state of an activation switch and a state in which the given activation condition is not satisfied is referred to as an off-state of the activation switch. Additionally, the activated state of the control unit 12 is referred to as the on-state and the sleep mode of the control unit 12 is referred to as the off-state. Moreover, the activated state of the respective sensors for measurement 21-1 to 21-n is referred to as the on-state and the stopped state (non-activated state) of the respective sensors for measurement 21-1 to 21-n is referred to as the off-state. Furthermore, a state in which the communication unit 14 performs communication of transmitting information of measurement results is referred to as the on-state and a state in which such communication is not performed is referred to as the off-state. In all units, the on-state is indicated by a high level and the off-state is indicated by a low level.

Note that operations shown in FIG. 4 to FIG. 7 are cited as examples and operations not shown in FIG. 4 to FIG. 7 may be performed.

Figure 4:
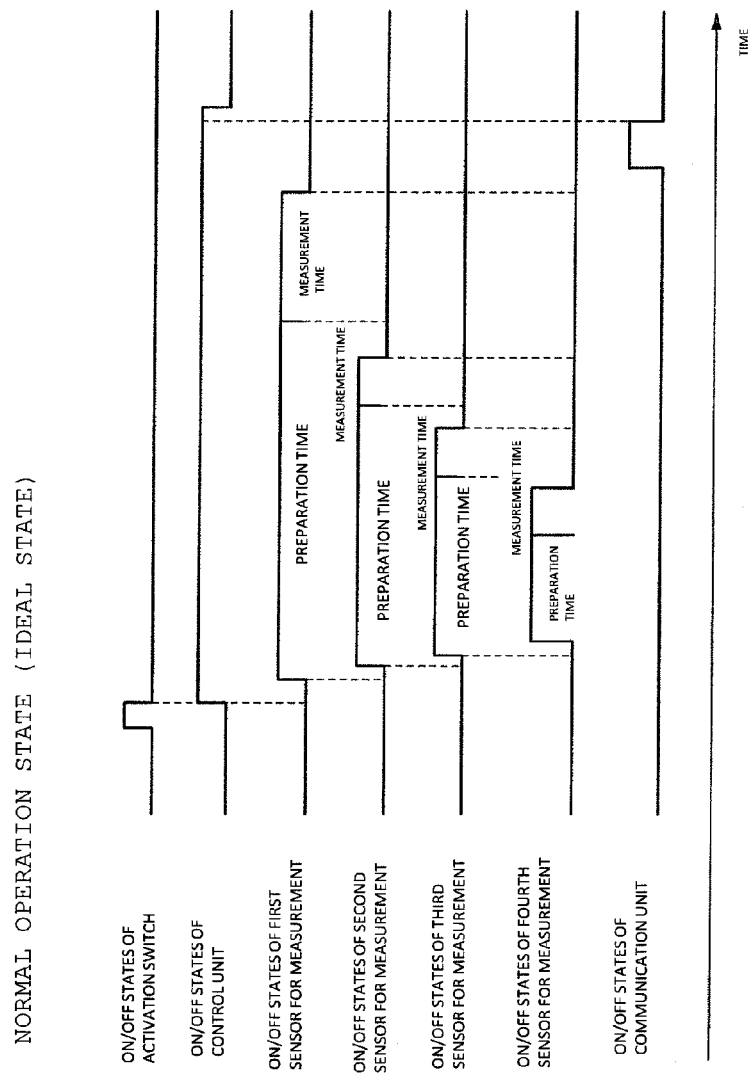
FIG. 4 is a diagram showing a time chart of operations in a normal operation state (ideal state) performed by the sensor terminal device according to a first operation example.

FIG. 4 is a diagram showing a time chart of operations in a normal operation state (ideal state) performed by the sensor terminal device 1 according to a first operation example.

In the time chart of FIG. 4, on/off states of the activation switch, on/off states of the control unit 12, on/off states of the first sensor for measurement 21-1, on/off states of the second sensor for measurement 21-2, on/off states of the third sensor for measurement 21-3, on/off states of the fourth sensor for measurement 21-4 and on/off states of the communication unit 14 are shown.

In the operation example, the preparation time becomes long as well as the time obtained by adding the preparation time and the measurement time becomes long in the order of the first sensor for measurement 21-1, the second sensor for measurement 21-2, the third sensor for measurement 21-3 and the fourth sensor for measurement 21-4.

Accordingly, in the operation example, the control unit 12 becomes the on-state when the activation switch becomes the on-state while the control unit 12 is in the sleep mode, after that, the first sensor for measurement 21-1, the second sensor for measurement 21-2, the third sensor for measurement 21-3 and the fourth sensor for measurement 21-4 are activated in this order based on the activation regulation information while delaying the time little by little among them, then, information of measurement results is transmitted by the communication unit 14 after the measurement results by all the sensors for measurement 21-1 to 21-4 have been acquired by the control unit 12. Then, the control unit 12 returns to the sleep mode again.

In the example, measurement times of respective sensors for measurement 21-1 to 21-4 do not overlap, and the time necessary for the entire operation of measurement can be shortened.

The control unit 12 can be temporarily in the sleep mode to thereby reduce power consumption when any of sensors for measurement 21-1 to 21-4 is not in the measurement time during a period from the activation until the control unit 12 becomes the sleep mode again, though not shown in FIG. 4.

Figure 5:
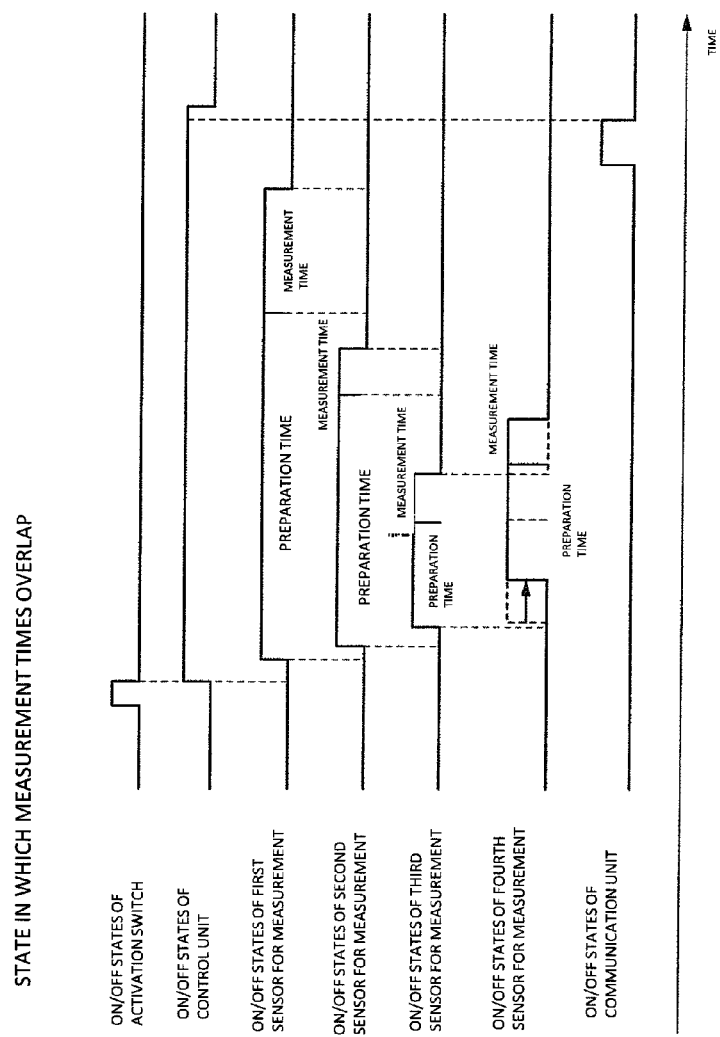
FIG. 5 is a diagram showing a time chart of operations in the case where measurement times overlap, which is performed by the sensor terminal device according to a second operation example.

FIG. 5 is a diagram showing a time chart of operations in the case where measurement times overlap, which is performed by the sensor terminal device 1 according to a second operation example.

In the time chart of FIG. 5, on/off states of the activation switch, on/off states of the control unit 12, on/off states of the first sensor for measurement 21-1, on/off states of the second sensor for measurement 21-2, on/off states of the third sensor for measurement 21-3, on/off states of the fourth sensor for measurement 21-4 and on/off states of the communication unit 14 are shown.

In the embodiment, assume that the first sensor for measurement 21-1, the second sensor for measurement 21-2, the third sensor for measurement 21-3 and the fourth sensor for measurement 21-4 are activated in this order while delaying the time little by little among them, the measurement time of the third sensor for measurement 21-3 and the measurement time of the fourth sensor for measurement 21-4 have an overlapped part. Accordingly, adjustment is performed so that the measurement times of respective sensors for measurement 21-1 to 21-4 do not overlap by appropriately delaying the activation timing of the four sensor for measurement 21-4 in a large degree. The adjustment is performed based on the activation regulation information.

In the example, the measurement times of the respective sensors for measurement 21-1 to 21-4 do not overlap, and the time necessary for the entire operation of measurement can be shortened.

The control unit 12 can be temporarily in the sleep mode to thereby reduce power consumption when any of sensors for measurement 21-1 to 21-4 is not in the measurement time during a period from the activation until the control unit 12 becomes the sleep mode again though not shown in FIG. 5.

Figure 6:
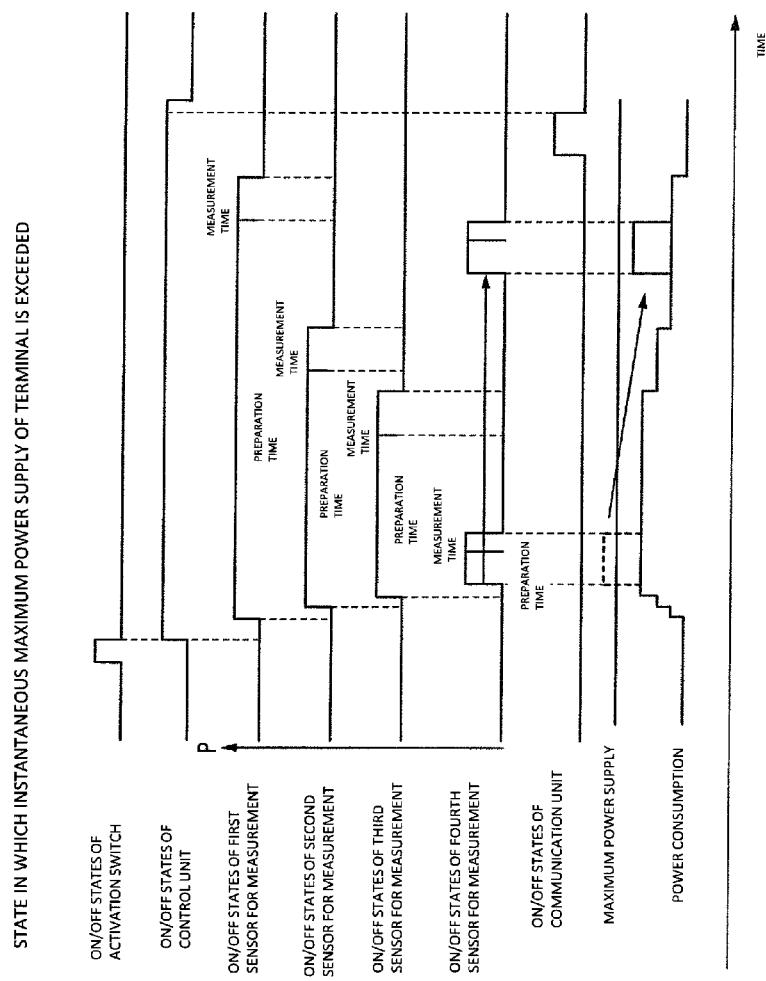
FIG. 6 is a diagram showing a time chart of operations in the case where instantaneous maximum power supply of the sensor terminal device is exceeded, which is performed by the sensor terminal device according to a third operation example.

FIG. 6 is a diagram showing a time chart of operations in the case where the instantaneous maximum power supply of the sensor terminal device 1 is exceeded, which is performed by the sensor terminal device 1 according to a third operation example.

In the time chart of FIG. 6, on/off states of the activation switch, on/off states of the control unit 12, on/off states of the first sensor for measurement 21-1, on/off states of the second sensor for measurement 21-2, on/off states of the third sensor for measurement 21-3, on/off states of the fourth sensor for measurement 21-4, on/off states of the communication unit 14, the instantaneous maximum power supply which can be obtained in the sensor terminal device 1 and power consumption are shown.

In the operation example, the preparation time becomes long as well as the time obtained by adding the preparation time and the measurement time becomes long in the order of the first sensor for measurement 21-1, the second sensor for measurement 21-2, the third sensor for measurement 21-3 and the fourth sensor for measurement 21-4.

In the embodiment, assume that the first sensor for measurement 21-1, the second sensor for measurement 21-2, the third sensor for measurement 21-3 and the fourth sensor for measurement 21-4 are activated in this order while delaying the time little by little them, the entire power consumption in the preparation time and the measurement time of the fourth sensor for measurement 21-4 exceeds the maximum power supply as power consumption in the preparation time and the measurement time of the fourth sensor for measurement 21-4 is large. Accordingly, adjustment is performed so that the entire power consumption is constantly equal to or less than the maximum power supply by appropriately delaying the activation timing of the four sensor for measurement 21-4 in a large degree. The adjustment is performed based on the activation regulation information.

In the example, the measurement times of the respective sensors for measurement 21-1 to 21-4 do not overlap, the entire power consumption is constantly equal to or less than the maximum power supply and the time necessary for the entire operation of measurement can be shortened.

The control unit 12 can be temporarily in the sleep mode to thereby reduce power consumption when any of sensors for measurement 21-1 to 21-4 is not in the measurement time during a period from the activation until the control unit 12 becomes the sleep mode again though not shown in FIG. 6.

Figure 7:
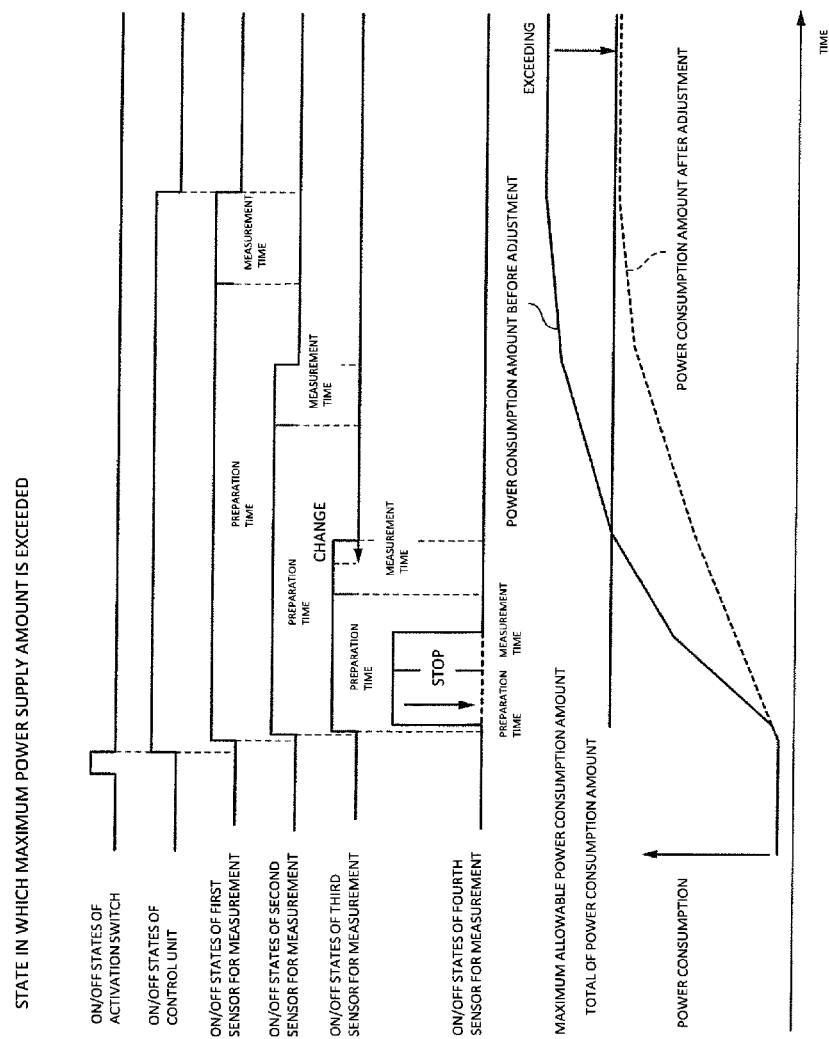
FIG. 7 is a diagram showing a time chart of operations in the case where the maximum power supply amount of the sensor terminal device is exceeded, which is performed by the sensor terminal device according to a fourth operation example.

FIG. 7 is a diagram showing a time chart of operations in the case where the maximum power supply amount of the sensor terminal device 1 is exceeded, which is performed by the sensor terminal device 1 according to a fourth operation example.

In the time chart of FIG. 7, on/off states of the activation switch, on/off states of the control unit 12, on/off states of the first sensor for measurement 21-1, on/off states of the second sensor for measurement 21-2, on/off states of the third sensor for measurement 21-3, on/off states of the fourth sensor for measurement 21-4, the maximum power supply amount (maximum allowable power consumption amount) which is temporarily averaged and can be obtained in the sensor terminal device 1, a power consumption amount before adjustment and a power consumption amount after adjustment are shown.

In the operation example, the preparation time becomes long as well as the time obtained by adding the preparation time and the measurement time becomes long in the order of the first sensor for measurement 21-1, the second sensor for measurement 21-2, the third sensor for measurement 21-3 and the fourth sensor for measurement 21-4.

In the embodiment, assume that the first sensor for measurement 21-1, the second sensor for measurement 21-2, the third sensor for measurement 21-3 and the fourth sensor for measurement 21-4 are activated in this order while delaying the time little by little among them, the total of the entire power consumption amount (a power consumption amount before adjustment) exceeds the maximum power supply amount with respect to the amount of power consumption which is temporarily averaged as power consumption in the preparation time and the measurement time of the fourth sensor for measurement 21-4 is large. Accordingly, adjustment is performed so that the total of the entire power consumption amount (the power consumption amount after adjustment) is equal to or less than the maximum power supply by changing the measurement time of the third sensor for measurement 21-3 is shortened and omitting and stopping the measurement by the fourth sensor for measurement 21-4 so as not to supply power to the fourth sensor for measurement 21-4. The adjustment is performed based on the activation regulation information.

In the example, the measurement times of the respective sensors for measurement 21-1 to 21-3 to be activated do not overlap, the entire power consumption amount is equal to or less than the maximum power supply amount and the time necessary for the entire operation of measurement can be shortened.

The control unit 12 can be temporarily in the sleep mode to thereby reduce power consumption when any of sensors for measurement 21-1 to 21-4 is not in the measurement time during a period from the activation until the control unit 12 becomes the sleep mode again though not shown in FIG. 7.

Here, for example, in the case where the measurement manner is changed such that measurement by any of the sensors for measurement is omitted as in the operation example shown in FIG. 7, it is possible to consider the order of importance of the respective sensors for measurement 21-1 to 21-$n$.

Specifically, the measurement manner by the sensors for measurement is changed by giving preference to the sensor with lower importance in accordance with the order of importance.

As an example, in the case where there is basic information of the sensors for measurement 21-1 to 21-$n$ shown in FIG. 3, when the maximum power supply (maximum allowable power consumption) of the power supply 15 becomes 3 mW at the maximum, the fourth sensor for measurement 21-4 having relatively low importance is not activated and is not operated.

As another example, in the case where there is basic information of the sensors for measurement 21-1 to 21-$n$ shown in FIG. 3, when the maximum power supply amount (maximum allowable power consumption amount) is 1580 $\mu$W·sec, the third sensor for measurement 21-3 is operated in the measurement mode "c". As further another example, in the case where there is basic information of the sensors for measurement 21-1 to 21-$n$ shown in FIG. 3, when the maximum power supply amount (maximum allowable power consumption amount) is 1190 $\mu$W·sec, the third sensor for measurement 21-3 is operated in the measurement mode "b" and the fourth sensor for measurement 21-4 is not activated and operated.

Here, the above operation controls are cited as examples, and other various operation controls may be performed.

Second Embodiment

Figure 8:
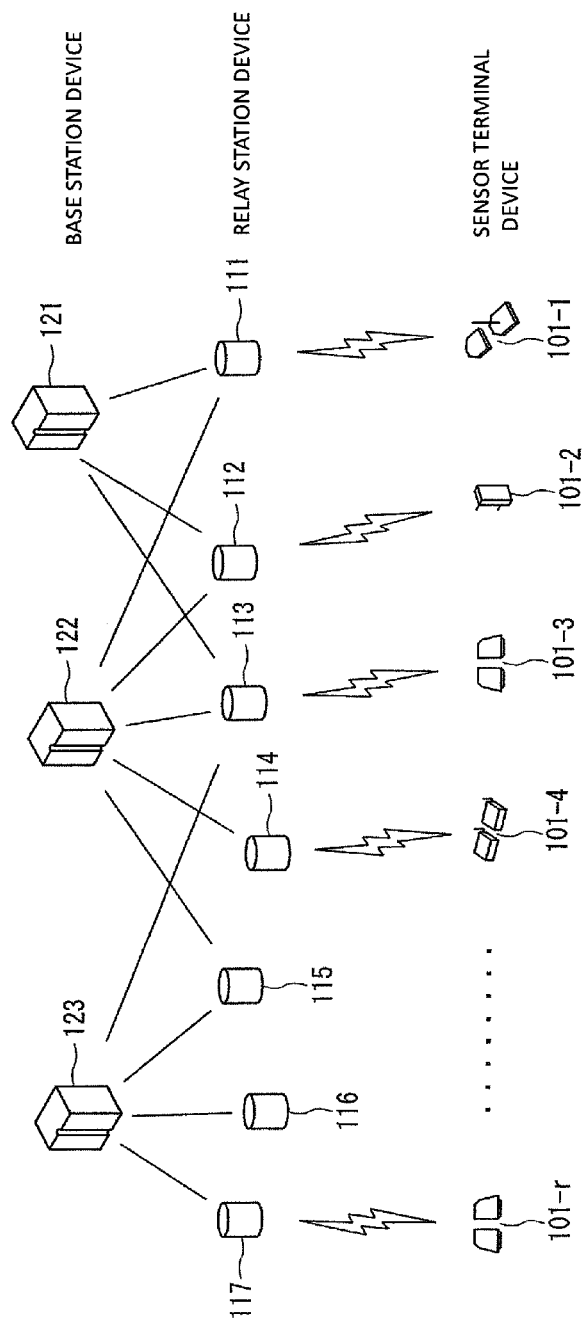
FIG. 8 is a schematic block diagram showing a configuration of a sensor network system according to a second embodiment of the present invention.

FIG. 8 is a schematic block diagram showing a configuration of a sensor network system (an example of a communication system) according to a second embodiment of the present invention.

The sensor network system according to the embodiment includes plural (r-pieces) sensor terminal devices 101-1 to 101-$r$ (examples of the terminal devices), plural relay station devices 111 to 117 and plural base station devices 121 to 123.

The respective numbers of the sensor terminal devices, the relay station devices and the base station devices may be arbitrarily set.

The respective sensor terminal devices 101-1 to 101-$r$ have the same configuration and perform the same operation as, for example, the sensor terminal device 1 according to the first embodiment shown in FIG. 1. For example, the respective sensor terminal devices 101-1 to 101-$r$ transmit information (data) of measurement results by the sensors for measurement included in the respective devices by wireless.

The respective relay station devices 111 to 117 receive information transmitted by wireless from the sensor terminal devices 101-1 to 101-$r$ existing in areas where the respective devices performs communication and transmit the information by wired communication.

The respective base station devices 121 to 123 receive information transmitted by wired communication from the relay station devices 111 to 117 existing under the respective devices.

Accordingly, in the sensor network system according to the embodiment, information of measurement results by the sensors for measurement provided in the respective sensor terminal devices 101-1 to 101-$r$ is collected by the base station devices 121 to 123 and the information is managed by being stored in a storage device (not shown) and so on.

Though the configuration in which information transmitted from the sensor terminal devices 101-1 to 101-$r$ is transmitted to the base station devices 121 to 123 through the relay station devices 111 to 117 is shown in the embodiment, it is also preferable to apply a configuration in which information transmitted from the sensor terminal devices 101-1 to 101-$r$ is directly transmitted to the base station devices 121 to 123 as another example.

For the communication described herein, wired communication as well as wireless communication may be used, and such form of communication is not limited to the disclosed embodiment.

Here, the sensor network system according to the embodiment may be applied to various scenes, for example, may be applied to a sensor network in a clean room, a sensor network in home security, a sensor network in environmental monitoring and so on. As an example, it is possible that particle sensors, flow sensors and so on are provided as sensors for measurement in the respective sensor terminal devices 101-1 to 101-$r$ in the sensor network in the clean room, and measurement results by these sensors for measurement are collected and managed by the base station devices 121 to 123.

Note that, in the sensor terminal device 1 according to the first embodiment, part of the device, for example, the function of the control unit 12 may be realized by a computer. In this case, the function may be realized by recording a program for realizing the control function in a recording medium readable by the computer and reading the program recorded in the recording medium by a computer system to execute the program by the computer system. The computer system referred to in this case includes an operating system (OS), hardware of peripheral devices. The recording media readable by the computer indicate portable recording media such as a flexible disk, a magneto-optical disk, an optical disk and a memory card as well as storage devices such as a magnetic hard disk and a solid state drive included in the computer system. Moreover, the recording media readable by the computer may also include media dynamically holding the program for a short period of time such as a computer network of Internet and a communication line used when transmitting the program through a phone line or a cellular phone network as well as media holding the program for a certain period of time such as a server device and a volatile memory inside the computer system to be a client in the above case. Furthermore, the above program may be a program for realizing part of the above function and further, may be realized by combination with a program in which the above function has been already recorded in the computer system.

The embodiments of the present invention have been described above with reference to the drawings, and the specific configurations are not limited to the described embodiments, and design and the like within a range not departing from the gist of the invention are included.

The terminal device, the communication system and the method of activating the terminal device can be applied to, for example, various types of sensor networks.

REFERENCE SIGNS LIST 1 sensor terminal device
11 activation unit
12 control unit
13 sensor unit
14 communication unit
15 power supply
16 storage device
21-1 to 21-$n$ sensors for measurement
101-1 to 101-$r$ sensor terminal devices
111 to 117 relay station devices
121 to 123 base station devices

The invention claimed is:

1. A terminal device comprising:
a plurality of measurement sensors for measuring physical quantities of measurement targets;
a storage unit for storing information relating to characteristics of the plurality of measurement sensors for determining a mode for activating the plurality of measurement sensors, the information stored in the storage unit including information on preparation times and measurement times of the respective plurality of measurement sensors, information on power consumption at the preparation and measurement times, information on minimum required electric energy at the preparation and measurement times, and activation regulation information for determining an activation manner of the plurality of measurement sensors;
a control unit for switching, based on the information stored in the storage unit, all or part of the plurality of measurement sensors from a non-activated state to an activated state when the measurement sensors are to be activated, the control unit controlling the activation of the measurement sensors by referencing the activation regulation information stored in the storage unit; and
an activation unit including an activation sensor driven on the basis of environmental changes, the activation unit being configured to activate the control unit on the basis of detection results from the activation sensor when a physical quantity correlated with the physical quantities of the measurement targets satisfies a given activation condition.

2. The terminal device according to claim 1, wherein the activation sensor is driven by generating power based on an environmental change.

3. The terminal device according to claim 1, wherein the activation regulation information stored in the storage unit includes, as an activation manner of the plurality of measurement sensors, an activation order determined based on power consumption of the measurement sensors; wherein a total power consumption of the measurement sensors to be activated is equal to or less than an allowable maximum value with respect to instantaneous power consumption in the stored information; and wherein the control unit does not activate the measurement sensors with a lowest preference when the total power consumption is equal to or higher than the allowable maximum value.

4. The terminal device according to claim 1, wherein the measurement times of the plurality of measurement sensors to be activated do not overlap with one another.

5. The terminal device according to claim 1, wherein mode determined by the information stored in the storage unit is selected such that an operation time of the control unit from the activation of the control unit until a series of operations by the control unit performed in accordance with the activation is completed becomes a minimum required time corresponding to the preparation time to be minimally required and the measurement time to be minimally required for the corresponding measurement sensor.

6. The terminal device according to claim 1, wherein the control unit drives the plurality of measurement sensors in descending order of the preparation time.

7. The terminal device according to claim 1, wherein the control unit drives the plurality of measurement sensors in descending order of the time obtained by adding the preparation time and the measurement time.

8. The terminal device according to claim 7, wherein the mode determined by the information stored in the storage unit is selected such that the total power consumption of the measurement sensors to be activated is equal to or less than an allowable maximum value with respect to instantaneous power consumption.

9. The terminal device according to claim 1, wherein the information stored in the storage unit further includes information based on a ranking of an order of importance of the respective plurality of measurement sensors.

10. The terminal device according to claim 1, wherein the information stored in the storage unit includes information relating to an order of activating the measurement sensors to be activated.

11. The terminal device according to claim 1, wherein the control unit enters a sleep mode when the measurement sensors to be activated are in the preparation time in the case where all or part of the measurement sensors are activated.

12. The terminal device according to claim 1, wherein based on the information stored in the storage unit, the control unit uses a standard activation mode in an initial state and thereafter uses an activation mode corrected from the standard activation mode in accordance with a change from the initial state.

13. The terminal device according to claim 1, wherein the information stored in the storage unit is a table showing correspondence between states of the terminal device and the mode determined by the information stored in the storage unit; and wherein the control unit is operated on the basis of the information stored in the storage unit.

14. The terminal device according to claim 1, wherein the control unit switches the measurement sensors from the non-activated state to the activated state by switching a state in which power is not supplied to the measurement sensors to a state in which power is supplied to the measurement sensors when activated.

15. A communication system comprising:
a terminal device comprising: a plurality of measurement sensors for measuring physical quantities of measurement targets; a storage unit for storing information relating to characteristics of the plurality of measurement sensors for determining a mode for activating the plurality of measurement sensors, the information stored in the storage unit including information on preparation times and measurement times of the respective plurality of measurement sensors, information on power consumption at the preparation and measurement times, information on minimum required electric energy at the preparation and measurement times, and activation regulation information for determining an activation manner of the plurality of measurement sensors; a control unit for switching, based on the information stored in the storage unit, all or part of the plurality of measurement sensors from a non-activated state to an activated state when the measurement sensors are to be activated, the control unit controlling the activation of the measurement sensors by referencing the activation regulation information stored in the storage unit; an activation unit including an activation sensor driven on the basis of environmental changes, the activation unit being configured to activate the control unit on the basis of detection results from the activation sensor when a given activation condition is satisfied; and a communication unit for transmitting information of measurement results by the activated measurement sensors; and a base station device for receiving information transmitted from the communication unit of the terminal device.

16. The communication system according to claim 15, wherein the activation sensor is driven by generating power based on an environmental change.

17. The communication system according to claim 15, wherein the information stored in the storage unit of the terminal device further includes information based on a ranking of an order of importance of the respective plurality of measurement sensors.

18. A method of activating a terminal device comprising the steps of:
storing, in a storage unit, information relating to characteristics of a plurality of measurement sensors for determining a mode for activating the plurality of measurement sensors, the information stored in the storage unit including information on preparation times and measurement times of the respective plurality of measurement sensors, information on power consumption at the preparation and measurement times, information on minimum required electric energy at the preparation and measurement times, and activation regulation information for determining an activation manner of the plurality of measurement sensors;

activating a control unit by an activation unit including an activation sensor, which is driven on the basis of environmental changes, when a given activation condition is satisfied based on a detection result by the activation sensor;

switching, by the control unit activated by the activation unit, all or part of the plurality of measurement sensors from a non-activated state to an activated state on the basis of the information stored in the storage unit when the plurality of measurement sensors are to be activated;

measuring, by the activated plurality of measurement sensors, physical quantities of measurement targets; and transmitting, by a communication unit, information of measurement results by the activated measurement sensors.

19. The method of activating the terminal device according to claim 18, wherein the activation sensor is driven by generating power based on an environmental change.

20. The method of activating the terminal device according to claim 18, wherein the information stored in the storage unit further includes information based on a ranking of an order of importance of the respective plurality of measurement sensors.

* * * * *